United States Patent
Chilaka et al.

(10) Patent No.: US 11,853,966 B2
(45) Date of Patent: Dec. 26, 2023

(54) INTERNET-BASED MANAGEMENT OF DISPLAYED PRINTED MEDIA

(71) Applicant: BREAD FINANCIAL PAYMENTS, INC., Columbus, OH (US)

(72) Inventors: Uchenna Chilaka, Blacklick, OH (US); Christian Billman, Gahanna, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 595 days.

(21) Appl. No.: 16/356,482

(22) Filed: Mar. 18, 2019

(65) Prior Publication Data
US 2020/0126040 A1 Apr. 23, 2020

Related U.S. Application Data

(60) Provisional application No. 62/747,584, filed on Oct. 18, 2018.

(51) Int. Cl.
| | |
|---|---|
| *G06Q 20/00* | (2012.01) |
| *G06Q 10/10* | (2023.01) |
| *G06F 16/14* | (2019.01) |
| *G06Q 10/087* | (2023.01) |
| *G06Q 20/20* | (2012.01) |

(52) U.S. Cl.
CPC ........... *G06Q 10/10* (2013.01); *G06F 16/148* (2019.01); *G06Q 10/087* (2013.01); *G06Q 20/203* (2013.01)

(58) Field of Classification Search
CPC .... G06Q 10/10; G06Q 10/087; G06Q 20/203; G06Q 20/387; G06Q 30/0207; G06F 16/148
USPC .......................................................... 705/342
See application file for complete search history.

(56) References Cited

U.S. PATENT DOCUMENTS

| | | | |
|---|---|---|---|
| 4,949,256 A * | 8/1990 | Humble | G06Q 20/20 235/487 |
| 9,786,145 B2 * | 10/2017 | Oppenheimer | G06K 7/10009 |
| 9,846,854 B1 * | 12/2017 | Lee | G06Q 10/0833 |
| 9,971,825 B2 * | 5/2018 | Sherman | H04L 63/083 |
| 2005/0149414 A1 * | 7/2005 | Schrodt | G06Q 10/087 705/29 |

(Continued)

FOREIGN PATENT DOCUMENTS

| | | | | |
|---|---|---|---|---|
| CN | 101213030 A | * | 7/2008 | ............ B07C 3/008 |
| KR | 2016006350 A | * | 1/2016 | |
| WO | WO-2015066594 A1 | * | 5/2015 | ........... B67D 1/0004 |

*Primary Examiner* — Russell S Glass (57) ABSTRACT

A system and method for Internet-based management of displayed printed media is disclosed. The method and system receive a plurality of data files from a plurality of different sources, each of the plurality of data files comprising information about printed media at a single source, the information includes: a printed media version and a location identifier. Each of the plurality of data files are evaluated to determine that one or more of the plurality of printed media are out-of-date. A metric that identifies each location having the one or more of the plurality of printed media that are out-of-date is generated. An instruction is automatically provided to each location having the one or more of the plurality of printed media that are out-of-date to remove the one or more of the plurality of printed media that are out-of-date.

20 Claims, 5 Drawing Sheets

(56) References Cited

U.S. PATENT DOCUMENTS

| | | | |
|---|---|---|---|
| 2005/0234778 A1* | 10/2005 | Sperduti | G06Q 20/327 |
| | | | 705/22 |
| 2009/0144076 A1* | 6/2009 | Berstis | G06Q 20/40 |
| | | | 705/14.1 |
| 2012/0066049 A1* | 3/2012 | Muthugopalakrishnan | ......... |
| | | | G06Q 20/387 |
| | | | 705/14.26 |
| 2012/0072274 A1* | 3/2012 | King | G06Q 30/0214 |
| | | | 705/14.16 |
| 2013/0085827 A1* | 4/2013 | Jenkins | G06Q 30/0239 |
| | | | 705/14.13 |
| 2018/0181412 A1* | 6/2018 | Paratey | G06F 3/011 |

* cited by examiner

```
┌─────────────────────────────────────────────────────┐
│ RECEIVES A PLURALITY OF DATA FILES FROM A PLURALITY │
│ OF DIFFERENT SOURCES, EACH OF SAID PLURALITY OF     │
│ DATA FILES COMPRISING INFORMATION ABOUT A PLURALITY │
│ OF PRINTED MEDIA AT A SINGLE SOURCE, THE            │
│ INFORMATION COMPRISING: A PRINTED MEDIA VERSION FOR │
│ EACH OF THE PLURALITY OF PRINTED MEDIA; AND A       │
│ LOCATION IDENTIFIER                                 │
│ 410                                                 │
└─────────────────────────────────────────────────────┘
                          │
                          ▼
┌─────────────────────────────────────────────────────┐
│ EVALUATES EACH OF THE PLURALITY OF DATA FILES FROM  │
│ EACH OF THE PLURALITY OF DIFFERENT SOURCES TO       │
│ DETERMINE THAT ONE OR MORE OF THE PLURALITY OF      │
│ PRINTED MEDIA ARE OUT-OF-DATE                       │
│ 420                                                 │
└─────────────────────────────────────────────────────┘
                          │
                          ▼
┌─────────────────────────────────────────────────────┐
│ GENERATES A METRIC THAT IDENTIFIES EACH LOCATION    │
│ HAVING THE ONE OR MORE OF THE PLURALITY OF PRINTED  │
│ MEDIA THAT ARE OUT-OF-DATE FROM THE LOCATION        │
│ IDENTIFIER                                          │
│ 430                                                 │
└─────────────────────────────────────────────────────┘
                          │
                          ▼
┌─────────────────────────────────────────────────────┐
│ AUTOMATICALLY PROVIDES AN INSTRUCTION TO EACH       │
│ LOCATION HAVING THE ONE OR MORE OF THE PLURALITY OF │
│ PRINTED MEDIA THAT ARE OUT-OF-DATE TO REMOVE THE    │
│ ONE OR MORE OF THE PLURALITY OF PRINTED MEDIA THAT  │
│ ARE OUT-OF-DATE                                     │
│ 440                                                 │
└─────────────────────────────────────────────────────┘
```

INTERNET-BASED MANAGEMENT OF DISPLAYED PRINTED MEDIA

CROSS-REFERENCE TO RELATED APPLICATIONS (PROVISIONAL)

This application claims priority to and benefit of U.S. Provisional Patent Application No. 62/747,584 filed on Oct. 18, 2018, entitled "INTERNET-BASED MANAGEMENT OF DISPLAYED PRINTED MEDIA" by Uchenna Chilaka et al., and assigned to the assignee of the present application, the disclosure of which is hereby incorporated herein by reference in its entirety.

BACKGROUND

Anytime a material change occurs to printed media, it is necessary that the underlying company that provides the printed media ensures that all of the printed media with material that has expired (e.g., has passed its material date) are removed from circulation. It is also the underlying company's responsibility to ensure that the display is filled with new and correct printed media. In the case of a small business, when a material change occurs there may only be tens or even hundreds of printed media that expired and need to be removed from circulation. As such, the collection of the no longer valid printed media would be a task that could be undertaken by an employee or two over a short time period.

However, in the case of a large business with a lot of locations there may be thousands, hundreds of thousands, or even millions of printed media that will all simultaneously pass their material date. Moreover, the printed media would not be in a few locations that could be easily collected by an employee or two, but instead it could be in hundreds or thousands of locations spread across a large geographical area that could include states, nations, continents, etc. For example, if a brand has 1,000 locations, the expired printed media could be in some or all of the brand locations, in some or all brand partner's stores, some or all franchise locations, and other not easily identifiable locations such as gas stations, mom-and-pop shops, diners, and the like.

Thus, finding, identifying, removing, and/or destroying all of the now out-of-date (or non-conforming) printed media becomes a herculean challenge that would include a nearly incalculable number of work-hours and incur significant costs.

In many cases, it is also important to track the destruction of the out-of-date printed media for regulatory purposes, and as such, even in the small company scenario, the reliance on employees alone could leave a company liable in the case of a human error.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "deciding", "determining", "interacting", "searching", "pinging" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

It should be appreciated that the obtaining or accessing of information conforms to applicable privacy laws (e.g., federal privacy laws, state privacy laws, etc.).

Overview

Embodiments described herein utilize modern devices in an Internet-centric environment to identify out-of-date printed media. In addition to identifying any out-of-date printed media, embodiments will allow an inventory of available printed media to be tracked at the store level. For example, if a brand that has 1,000 locations distributes printed media thereto, the printed media could end up in some or all of the brand locations, in some or all brand partner's stores, in some or all franchise locations, and other not easily identifiable locations such as gas stations, mom-and-pop shops, diners, and the like. As such, the ability to identify the valid and/or expired printed media would provide significant savings in identifying the expired printed media and also reduce the liability to the underlying company whose expired printed media 110 would otherwise remain in circulation. Moreover, the capability to make real-time, automated, and repeatable counts of available printed media at one or more locations would provide a significant monetary savings in printing and/or shipping costs, ensure no loss of new customer captures due to the running out of printed media from the one or more locations, and reduce regulatory risk due to version control, e.g., by knowing which version of a document a consumer received as that version dictates the terms of the relationship with the consumer. Moreover, by being able to track the version of the printed media received by a consumer, the brand would know which versions were obtained, a ballpark number of a previous version (or versions) that were taken by customers and may remain "active", etc.

In one embodiment, by using the real-time, automated tracking of the available printed media at each printed media display, the printed media management system is able to track printed media outflow (or flow-rate) at each location. In addition, by analyzing the outflow information, the printed media management system could provide a number of different metrics to the underlying company associated with the printed media. For example, the printed media management system could identify locations that are meeting and/or surpassing printed media distribution goals as well as identifying locations that falling below printed media distribution goals. In one embodiment, the identification of the distribution performance for one, some or all locations could be used to assign bonuses, indicate locations that need retraining, adjust allocation of the number of printed media that are allotted to the different locations, and the like.

In one embodiment, the printed media management system is also able to reduce the underlying company's printing and shipping costs by providing the underlying company with specific locations that will need a resupply of printed media. In one embodiment, the printed media management system is also able to reduce the underlying company's regulatory risk due to version control, e.g., by knowing which version of a document a consumer received as that version dictates the terms of the relationship with the consumer. Moreover, by being able to track the version of the printed media received by a consumer, the brand would know which versions were obtained, a ballpark number of a previous version (or versions) that were taken by customers and may remain "active", etc.

In addition, the printed media management system can provide cost savings logistics for underlying companies that have a high rate of printed media turn-over. For example, if the underlying company updates their terms, conditions, offer, or the like on a regular basis (e.g., quarterly, semi-annually, annually, etc.), the printing costs per-cycle would be significant. Moreover, there would be wasted costs if the amount of printed media ordered was too large. That would result in extra printing costs to produce a number of printed media that were out-of-date before they were ever displayed, ever unboxed from a store room, ever left a distribution center, or the like. In another embodiment, the printing costs could be significant due to the need to make an additional printing order due to a low initial print size. In one embodiment, the printed media management system is able to provide an automated ordering capability to further optimize logistics.

However, since the printed media management system can track the distribution rate (or flow-rate) of printed media through one, some, or all locations; the printed media management system can provide the underlying company a metric that identifies the number of printed media that were distributed by the various locations in the previous quarters (the metric could be an average for a number of previous periods, an approximate amount for the most previous period, or the like, and could further be used in a trend analysis that would suggest an increase or decrease in the print order). The underlying company would be able to use the metric to tailor the print order for the next round of printed media to more closely match the likely amount of printed media that will be distributed before reaching their material date.

Moreover, if the printed media management system determines the flow-rate at the location level, e.g., identifies the number of printed media that were taken from each location in the previous quarter(s); the distribution cost for the printed media could also be minimized. In other words, instead of the underlying company sending each location an initial 500 count of the printed media, the number of printed media provided to each location could be based on each location's prior distribution numbers (e.g., an actual, a close proximity, or the like depending upon the level of granularity). For example, if location A has a quarterly distribution of approximately 1000 of the printed media and location B has a quarterly distribution of approximately 100 of the printed media, the replacement printed media could be distributed accordingly. In so doing, at the end of the next quarter, there would not be 400 of the printed media remaining in the possession of location B and there would not have been a need to send a second distribution of 500 additional printed media to location A.

Importantly, the embodiments of the present invention, as will be described below, provide a system and method for internet-based management of displayed printed media which differs significantly from the conventional processes used to manage displayed media. In conventional approaches, when a printed material expires, has changed terms, or otherwise becomes non-conforming, the company would send out workers to remove and replace the expired printed material with new valid printed material.

However, the conventional approach will grow exponentially and incur significant labor-hours and costs as the amount of printed media in circulation. Moreover, as the total number of locations to search grows, so does the opportunity for the accidental overlooking of an expired application which can result in liability for the underlying company.

In contrast, embodiments described herein, with regard to the management and liability of printed media 110, allow real-time identification, operation, flow-rate, and the like. Moreover, the solution is not simply the conventional approach adjusted to use on a computing device or handled over a network. Instead, the use of identifiers and readers on the printed media requires a completely new and different system than that which is presently available. Moreover, real-time and continuous monitoring and identification of printed media on display will ensure that no overlooked out-of-date printed material that may have found its way back to a display will remain unidentified. Instead, as soon as the out-of-date printed material is added to the display it will be identified by the printed media management system, and a removal-from-circulation operation will be automatically initiated.

Thus, by utilizing embodiments such as those described herein, the printed media management system can determine the location of any out-of-date printed media that are being displayed. Moreover, since the printed media management system is capable of automatically providing alerts, emails, etc. the location and removal of any out-of-date printed media that is displayed can be automatically performed. That is, the printed media management system could email, autodial, or text a store manager and provide identification and removal guidance thereby allowing the store to remove the displayed out-of-date printed media from circulation. Moreover, the printed media management system can provide further automated guidance such as return the out-of-date printed media to a designated location, destroy the out-of-date printed material by shredding, etc. In addition, the printed media management system can continuously monitor and identify any out-of-date printed media that are returned to circulation, and can therefore be used in fraud mitigation, liability reduction, regulatory control, and tracking.

Thus, embodiments of the present invention provide a printed media management system which is completely different than what was previously done because of the Internet-centric aspect of the printed media management system that relies on information being recorded and provided via the web at any selectable time-period. In other words, there is no way that the old methodology of sending a person or persons into the field to monitor application flow, root-out expired applications, or the like could hope to obtain the management, flow-rate, and other metrics that are automatically provided by the printed media management system as discussed herein.

As will be described in detail, the various embodiments of the present invention do not merely implement conventional printed media management processes on a computer. Instead, the various embodiments of the present invention, in part, provide a previously unknown and unavailable procedure for managing printed media across any number of actual store locations. In so doing, embodiments provide a consistently accurate, repeatable, timely, and error proof capability of managing printed media, to include expired printed media, incorrect printed media, and the like. Hence, embodiments of the present invention provide a novel process for managing printed media which is necessarily rooted in Internet-centric computer technology to overcome the numerous problem specifically arising in the realm of non-Internet based printed media management.

Moreover, the embodiments do not recite a mathematical algorithm; nor do they recite a fundamental economic or longstanding commercial practice. Instead, they address a business challenge that has had no solution prior to the Internet-based management of displayed printed media. Thus, the embodiments do not "merely recite the performance of some business practice known from the pre-Internet world along with the requirement to perform it on the Internet." Instead, the embodiments are necessarily rooted in network-centric environments in order to overcome numerous problems and liabilities specifically arising in the realm of printed media management.

Operation

Figure 1:
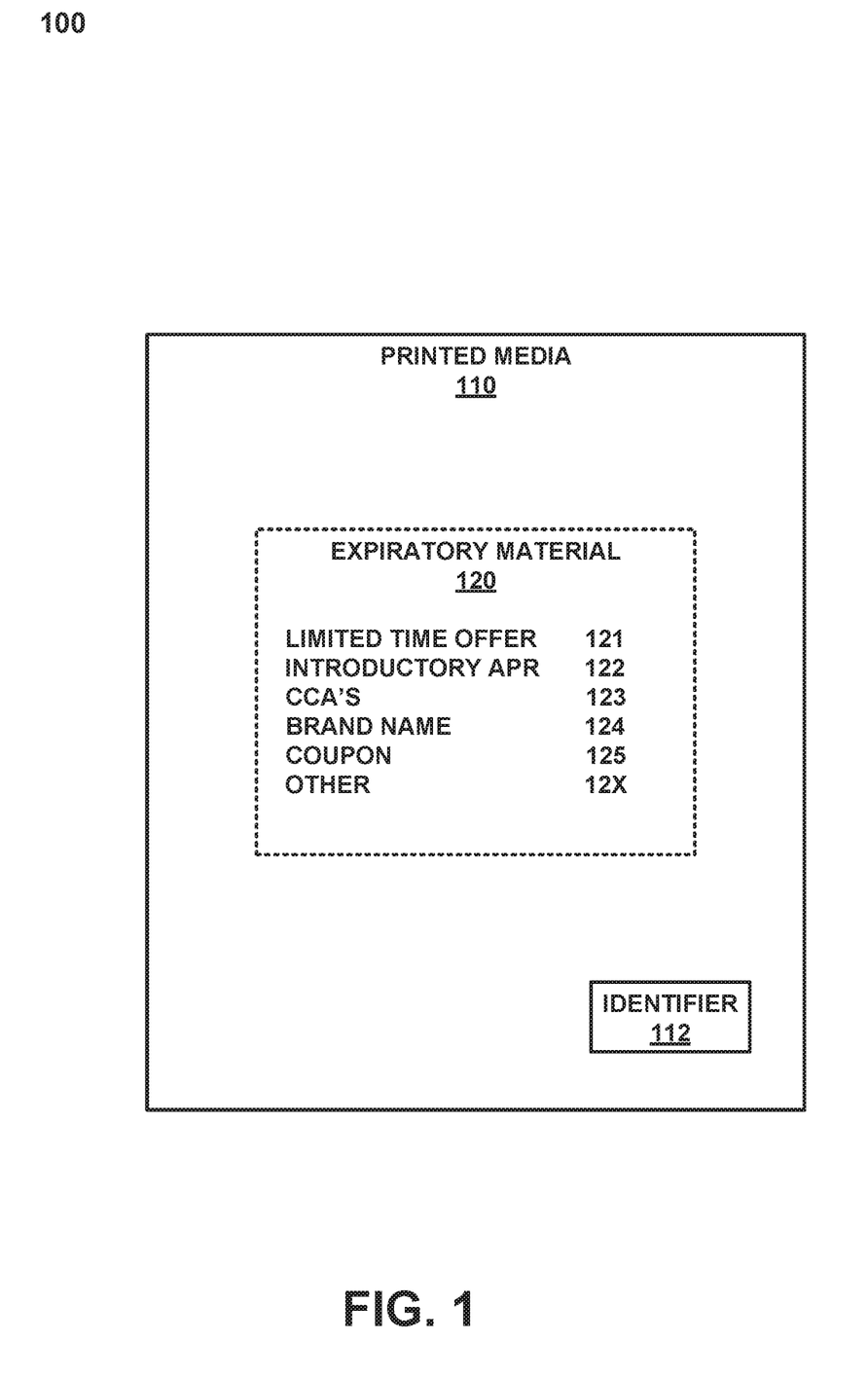
FIG. 1 is a block diagram of a printed media having an identifier coupled thereto, in accordance with an embodiment.

Referring now to FIG. 1, a block diagram 100 of a printed media 110 is shown. In one embodiment, printed media 110 includes an identifier 112 and expiratory material 120. In general, printed media 110 is a document such as a pamphlet, an application, an advertisement, or the like. For example, printed media 110 could be a tri-fold or the like that includes a description of a thing being advertised. In the case of printed media 110 providing a description of a thing being advertised, there may be no expiratory material 120 and thus no material date. That is, printed media 110 would not include anything that expires, will be subject to change, amendment, cancelation, or the like. Examples of printed media 110 without a specific expiration could include a tourist attraction such as a zipline, a hot air balloon ride, etc. In other cases, printed media 110 could be a document that includes expiratory material 120 such as a limited time offer 121, an introductory APR 122, credit card account agreement (CCA's 123), a brand name 124, a coupon 125 for a percentage off, other 12x, and the like, there will likely be a material date.

In general, a material date refers to the date at which any expiratory material 120 that is within the printed material 110 expires, is invalidated, has been changed, and the like. For example, the material date with respect to a limited time offer 121 would be the date at which the limited time has tolled. Similarly, the material date for a coupon 125 would be the date that the coupon 125 expires.

In another example, the material date would be the date that one or more of the CCA's 123 or the introductory APR 122 of a credit application change, the brand name 124 changes (the brand image is updated, etc.). In general, CCA's 123 cover terms and conditions for using and managing a credit card account. A change to the CCA's 123 could include a change in compliance aspects, applicable laws, APR, introductory rewards, fees, overage charges, or the like. As such, the material date of printed media 110 would be when the CCA's 123 change. Once the change occurs, the now incorrect credit applications would need to be removed from the public display and replaced with new corrected credit applications. One example would be the credit application containing expiratory material 120 such as an introductory APR 122. When the introductory APR 122 is changed to a new and different introductory APR, that would mark the material date for the application as it would identify the presently available credit application as having a now incorrect introductory APR.

Figure 3:
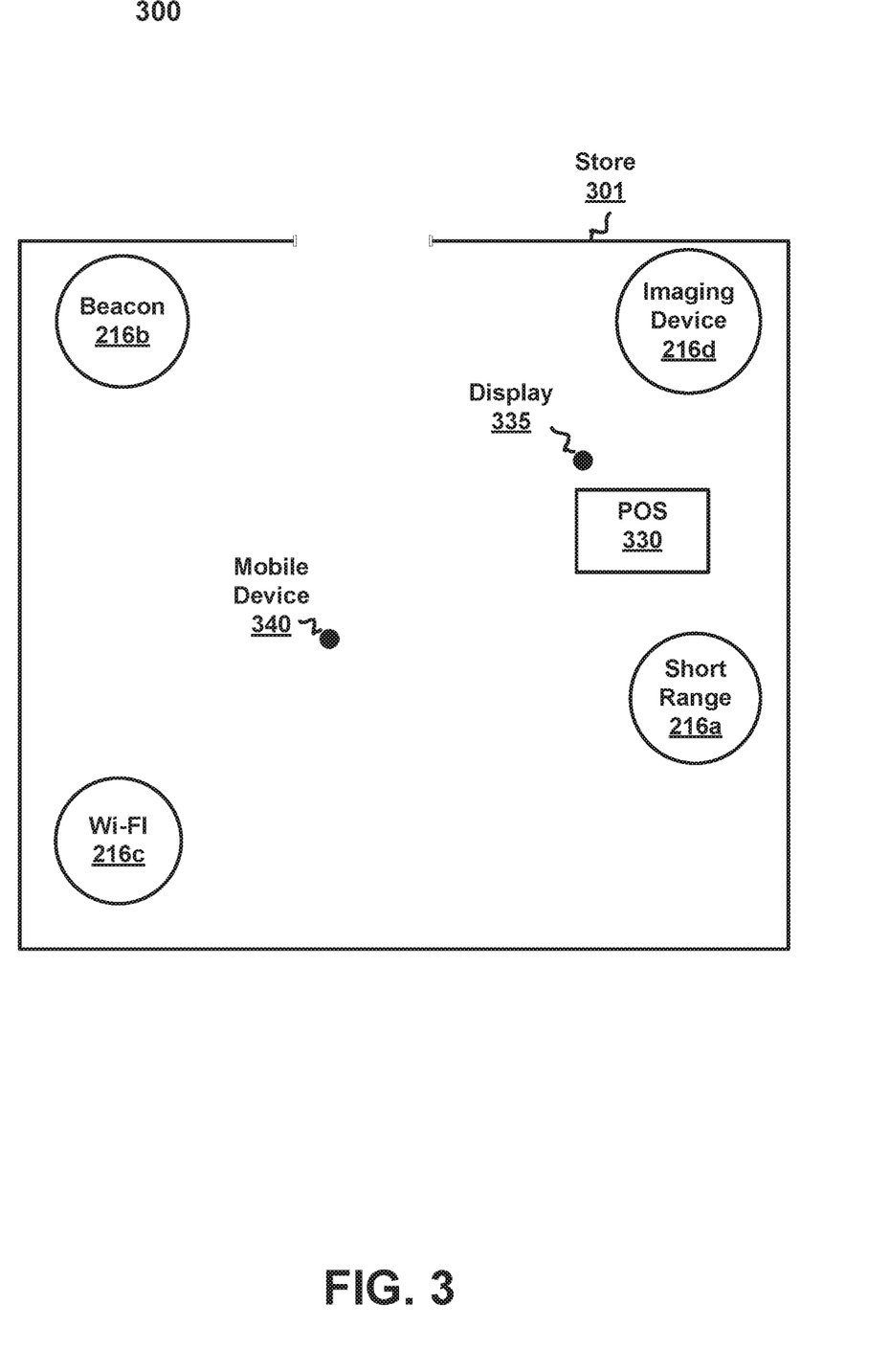
FIG. 3 is a top plan view of a store utilizing the internet-based management of displayed printed media, in accordance with an embodiment.

Anytime a material change occurs, it is necessary that the underlying company that provides the printed media ensures that all of the printed media 110 with expiratory material 120 that has expired (e.g., has passed its material date) are removed from circulation (e.g., removed from the display 335). It is also the underlying company's responsibility to ensure that the display 335 is filled with new and correct printed media 110, etc., (e.g., the correct printed media 110 would be an updated version of the printed media 110 that includes any new CCA's, material dates, and the like). In the case of a small business, there may only be tens or even hundreds of printed media 110 that expired and need to be removed from circulation. As such, the collection of the no longer valid printed media 110 would be a task that could be undertaken by an employee or two over a short time period.

However, in the case of a large business with a lot of locations there may be thousands, hundreds of thousands, or even millions of printed media 110 that will all simultaneously pass their material date. Moreover, printed media 110 would not be in a few locations that could be easily collected by an employee or two, but instead printed media 110 could be in hundreds or thousands of locations spread across a large geographical area that could include states, nations, continents, etc. For example, if a brand has 1,000 locations, printed media 110 could be in some or all of the brand locations, in some or all brand partner's stores, some or all franchise locations, and other not easily identifiable locations such as gas stations, mom-and-pop shops, diners, and the like.

Thus, finding, identifying, removing, and/or destroying all of the now out-of-date (or non-conforming), printed media 110 from circulation becomes a herculean challenge that would include a nearly incalculable number of work-hours and incur significant costs. Further, even after the task of finding, identifying, removing, and/or destroying the out-of-date printed media 110 is undertaken, due to the widespread distribution of printed media 110, there will likely be locations where the out-of-date printed media 110 was not found, identified, and removed.

For example, identifying an unknown location(s) that still has the out-of-date printed media 110, or has mixed out-of-date printed media 110 with updated printed media 110, is initially a nearly impossible task. That is, if the location of out-of-date printed media 110 is initially unknown it would be merely a matter of luck to find the out-of-date printed media 110 unless and until a completed out-of-date printed media 110 (having a location identifier thereon) was received at the underlying company from a customer. Further, if the store simply adds new printed media 110 into display 335 in front of the out-of-date printed media 110, it would take a search of every printed media 110 in the display 335 (e.g., holder, rack, stack, poster, etc.) and the store room, etc., to confirm that all out-of-date printed media 110 has been removed from circulation.

In one embodiment, any printed media 110 that has passed its material date (e.g., contain a no-longer valid offer, APR, term(s), discount, percent off, etc.) but has not been removed from service could be a liability for the underlying company, or even used for fraudulent purposes. For example, in the case of a term change such as an APR change, if an applicant finds and applies for a credit account with an out-of-date credit application that has the old APR offer (or old terms), the credit account provider could be legally required to honor the old APR offer (or old terms) for a legally defined period of time. Similarly, if an applicant finds an out-of-date reward account printed media 110 that has a sign-up bonus of 100,000 points (versus the new reward account printed media 110 that has a 25,000-point sign-up bonus), the reward account provider could be legally required to honor the 100,000-point bonus. Moreover, if the applicant finds and applies for a credit account with an out-of-compliance credit application that has no longer legal terms, the credit account provider could be fined or otherwise sanctioned by a legal authority.

Thus, there can be significant monetary and/or liability costs in failing to identify and remove/destroy any printed media 110 that has passed its material date.

Identifier 112 will provide an identification of the printed media 110. In one embodiment, identifier 112 could disclose a printed media 110 type, (e.g., a credit account application, coupon, reward account application, etc.) and also the printed media version (or print date, etc.). For example, identifier 112 could identify printed media 110 as "bank X credit account application version 5.1".

In one embodiment, identifier 112 is an RFID tag, a Bluetooth sticker, an NFC tag, a video readable barcode, and the like. In one embodiment, the identifier 112 could be placed on every printed media 110. In one embodiment, the identifier 112 would only be placed on printed media 110 that includes expiratory material 120 that may incur a future material date.

In one embodiment, identifier 112 could be manufactured in, printed on, or otherwise coupled to printed media 110 during the initial manufacture of the printed media 110. However, in the case of printed media 110 that are already manufactured, printed, distributed, displayed, etc., identifier 112 could be a sticker, tag, stamp, or the like that could be coupled to the printed media 110.

Figure 2:
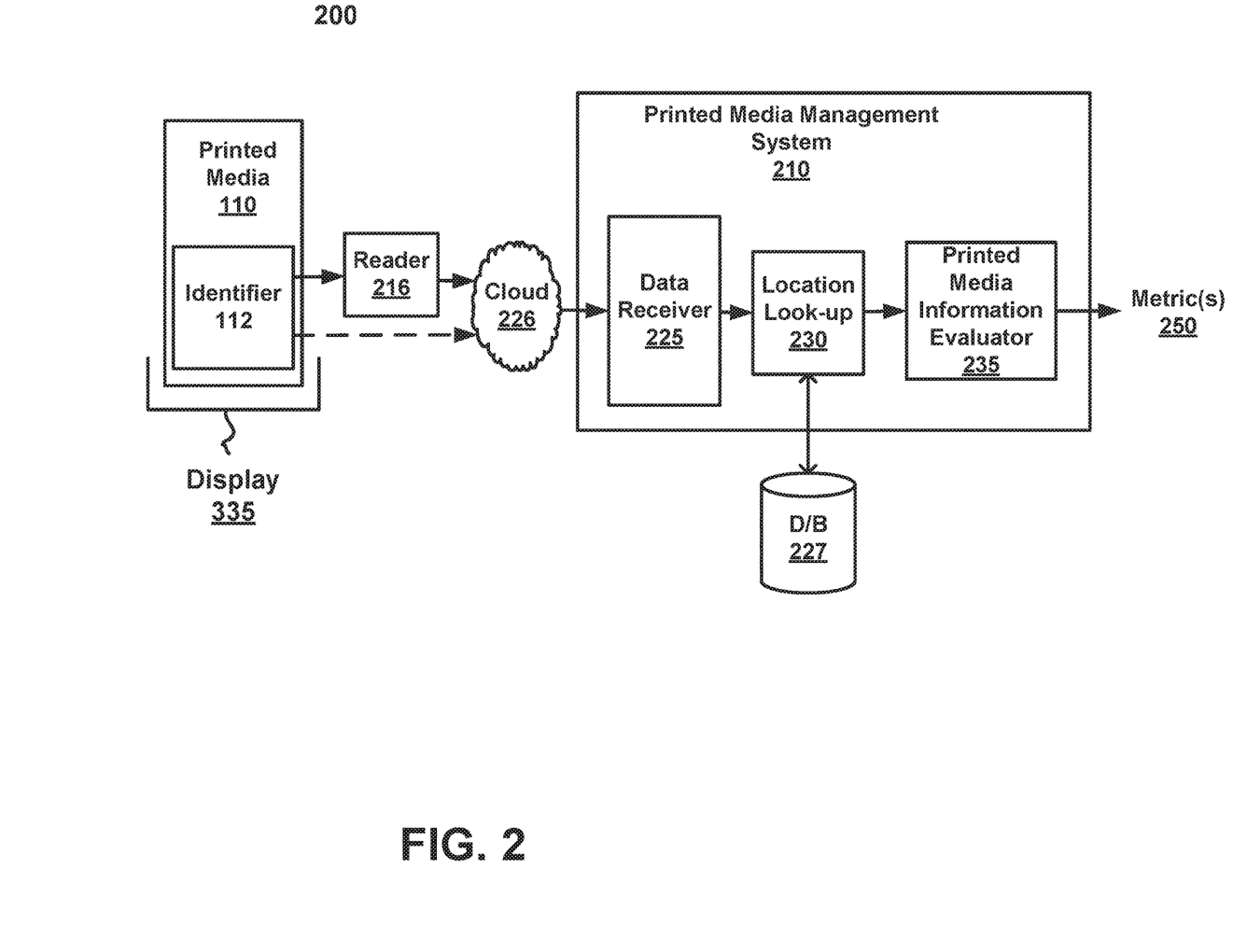
FIG. 2 is a block diagram of a system for internet-based management of displayed printed media, in accordance with an embodiment.

With reference now to FIG. 2, a block diagram of a system 200 for Internet-based management of displayed printed media 110 is shown in accordance with an embodiment. FIG. 2 includes printed media 110 having an identifier 112 coupled thereto, a display 335, cloud 226, printed media management system 210, database 227, and metric(s) 250.

In one embodiment, the printed media 110 is distributed via a display 335. In general, display 335 could be, but is not limited to, a rack, a holder, a table, a poster hanging in a store, or the like. In one embodiment, the identifier 112 on the printed media 110 is identified by a reader 216. In general, reader 216 captures the information from identifier 112 coupled with the printed media 110 and provides the information over a network (e.g., the Internet or the like) to printed media management system 210.

For example, reader 216 may be, but is not limited to, a short-range device 216a (e.g., an RFID reader, an NFC device, a Bluetooth device, etc.), an imaging device 216d, Wi-Fi 216c, a beacon 216b, or the like. In one embodiment, reader 216 could be part of a functionality that already exists in the location's computer system (e.g., a POS 330, mobile device 340, etc.), a hardware device (such as a dongle or the like) that is coupled with the location's computer system, or the like. Similarly, the reader 216 could be functionality provided by an app on the location's computer system.

Identifier 112 will provide information identifying the printed media 110 to which it is coupled. For example, identifier 112 could identify printed media 110 as "bank X credit account application version 5.1".

In one embodiment, reader 216 will obtain the information identifying the printed media 110 from each identifier 112 in display 335 and provide the obtained information over the network to printed media management system 210. In one embodiment, reader 216 will also provide location information to printed media management system 210. The location information could be, but is not limited to, a lat-long, a reader device ID, a store identifier, a beacon ID, a Wi-Fi ID, a MAC address from POS 330, or the like.

The transmission of data from reader 216 to printed media management system 210 may be on a schedule such as, daily, weekly, or any pre-defined transmission interval. Moreover, the transmission interval could be constant across all locations, vary between locations, vary by printed media 110 type, or the like. For example, high printed media 110 flow-rate locations could have a shorter transmission interval than low printed media 110 flow-rate locations; Locations with printed media 110 that includes expiratory material 120 could have a shorter transmission interval than locations with printed media 110 that doesn't include expiratory material 120; etc.

In one embodiment, the identifier 112 coupled with printed media 110 could be a smart identifier that includes a wireless network functionality (e.g., a Wi-Fi enabled tag, or the like). As such, there would be no need for a reader 216 as the smart identifier 112 would be able to connect to a network (e.g., Wi-Fi, a cellular network, etc.) and transmit the printed media 110 and location information over a network connection to printed media management system 210. In one embodiment, the location information could be a store identifier, a Wi-Fi device identifier, a coordinate location uploaded to smart identifier 112, or the like.

In one embodiment, database 227 includes a plurality of (store) locations and a list of device identifiers that are associated with each of the (store) locations. Moreover, database 227 could be a local database, a virtual database, a cloud database, a plurality of databases, or some combination thereof.

Figure 5:
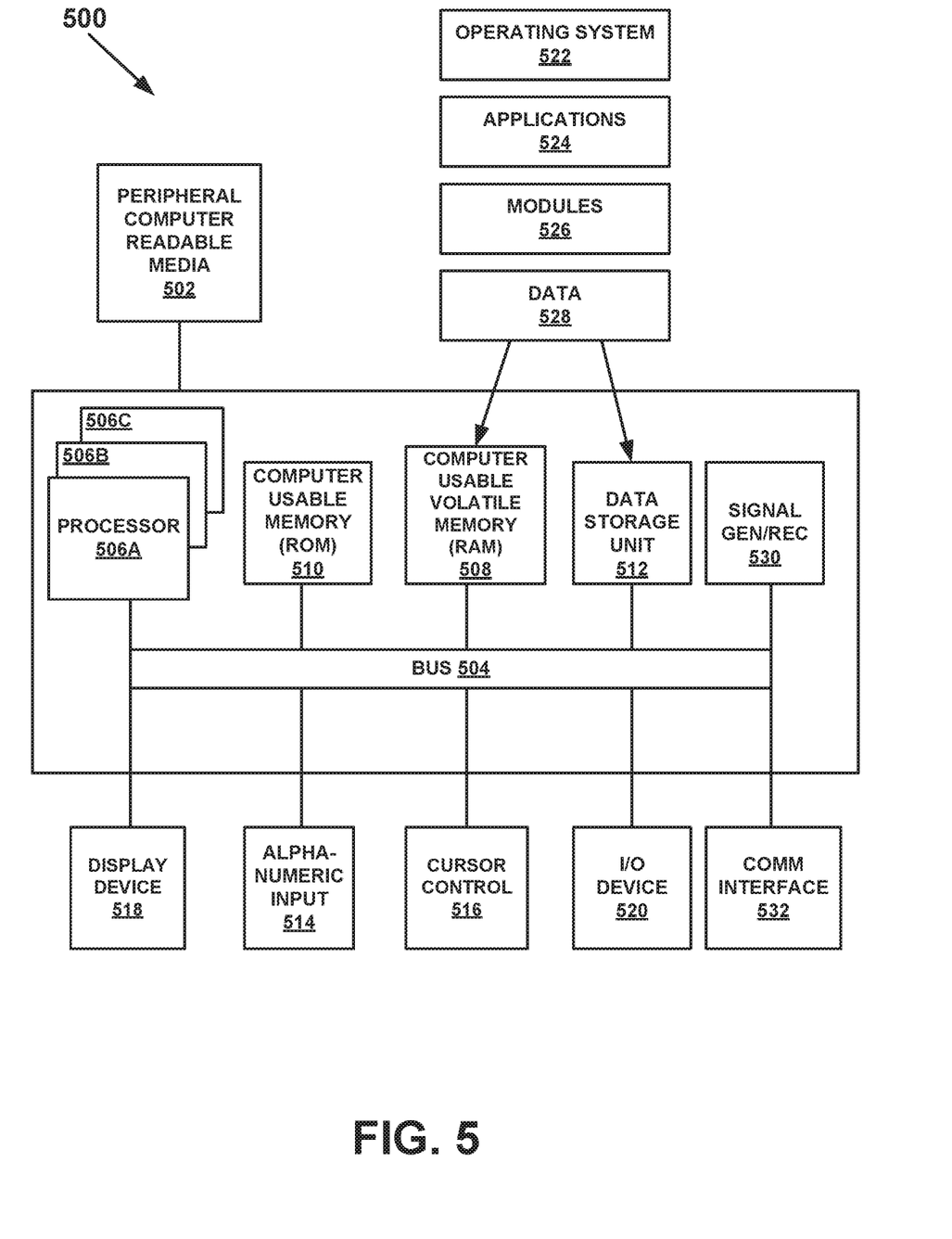
FIG. 5 is a block diagram of an example computer system with which or upon which various embodiments of the present invention may be implemented.

In one embodiment, printed media management system 210 is a computing system such as computer system 500 described in detail in the FIG. 5 discussion herein. In one embodiment, printed media management system 210 includes data receiver 225, location look-up 230, and printed media information evaluator 235.

Data receiver 225 receives the information from reader 216 and/or identifier 112, via cloud 226 (e.g., the Internet, a cellular network, or the like). For example, the received information would identify printed media 110 and would also include a location identifier. For example, the received information could be "4-bank X credit account application version 5.1; and 17-bank X credit account application version 6.0 identified by reader 216 having device ID: 876590."

Location look-up 230 accesses database 227 and utilizes the received device ID: 876590 to identify the location (e.g., store 301) to which the received device ID: 876590 is associated. The identified location (e.g., store 301) would be added to the data transmitted along with the printed media 110 data and provided to printed media information evaluator 235. E.g., "4-bank X credit account application version 5.1; and 17-bank X credit account application version 6.0 are in display 335 at store 301".

Printed media information evaluator 235 will analyze the received data in conjunction with the identified location (e.g., store 301) and determine one or more metric(s) 250 described in detail herein. In general, the metric(s) 250 could include: identification and location of any out-of-date printed media 110, identification of a location that does not have any printed media 110 on display 335, a printed media 110 flow-rate for one, some or all locations for a certain printed media 110, a printed media 110 flow-rate for one, some or all locations for a plurality of different types of printed media 110, and the like.

For example, if bank X credit account application should be version 6.0, then printed media information evaluator 235 would identify the 4-bank X credit account application version 5.1 as being out-of-date printed media 110 that should be removed from circulation. Printed media information evaluator 235 would then provide metric(s) 250 that could include one or more of: an alert the underlying company (e.g., bank X) about the 4 out-of-date printed media 110 that are still in circulation at store 301, an alert to the contact information for store 301 informing them of the 4 out-of-date printed media 110. In one embodiment, the alert to the store 301 would include a description of the 4 out-of-date printed media 110 such that a receiving party at the store could identify and remove the appropriate printed media 110, and the like.

In contrast, if both bank X credit account application version 5.1 and version 6.0 are still in compliance, then printed media information evaluator 235 would provide metric(s) 250 that could include one or more of: there are 4-bank X credit account applications version 5.1 and 17-bank X credit account applications version 6.0" on display at store 301. A flow-rate for bank X credit account application version 5.1, a flow-rate for bank X credit account application version 6.0, and/or a flow-rate for all bank X credit account applications for store 301, and the like.

Referring now to FIG. 3, a top plan view 300 of a store shown in accordance with an embodiment. In general, store 301 is building that includes an area for the presentation of printed media 110.

In one embodiment, store 301 includes one or more readers such as, but not limited to: mobile device 340, beacon 216b, Wi-Fi 216c, POS 330, short-range device 216a, imaging device 216d, and the like, that will monitor an environment for an identifier 112. In one embodiment, two or more of reader 216 capabilities could be incorporated into a single reader 216. For example, mobile device 340 (or POS 330, etc.) could include a short-range device 216a, beacon 216b, Wi-Fi 216c, and/or imaging device 216d. In one embodiment, the reader 216 is coupled with the display 335 (e.g., rack, holder, or the like), placed in another location distinct from the POS 330, etc.

In general, mobile device 340 is a store's mobile device, an associate's mobile device, or the like. Mobile device 340 could be a mobile phone, a smart phone, a tablet, a smart watch, a piece of smart jewelry, smart glasses, or other user portable device having wireless connectivity. Moreover, mobile device 340 would be capable of broadcasting and receiving via at least one network, such as, but not limited to, WiFi, Cellular, Bluetooth, NFC, and the like.

In one embodiment, imaging device 216d could be a camera on mobile device 340, a POS 330 image capturing device, a surveillance camera, or any image or video capturing device that can obtain a usable image or video of the identifier 112 (e.g., a barcode or other visual identifier) on the printed media 110. For example, imaging device 216d could capture an image of the barcode on the top (or front or back) of printed media 110. In one embodiment, is the printed media is in a stack, imaging device 216d would be limited to only ensuring the visible printed media 110 is up-to-date without providing any information about any of the other printed media 110 there below. In one embodiment, imaging device 216d would provide the captured information to printed media management system 210 via a network connection, such as, the mobile network, Wi-Fi, or the like. In one embodiment, imaging device 216d could capture information that would include a number of frames that show printed media 110 being removed from display 335 (or stack, etc.) which could be used to determine a printed media 110 flow-rate as described in detail herein.

Figure 4:
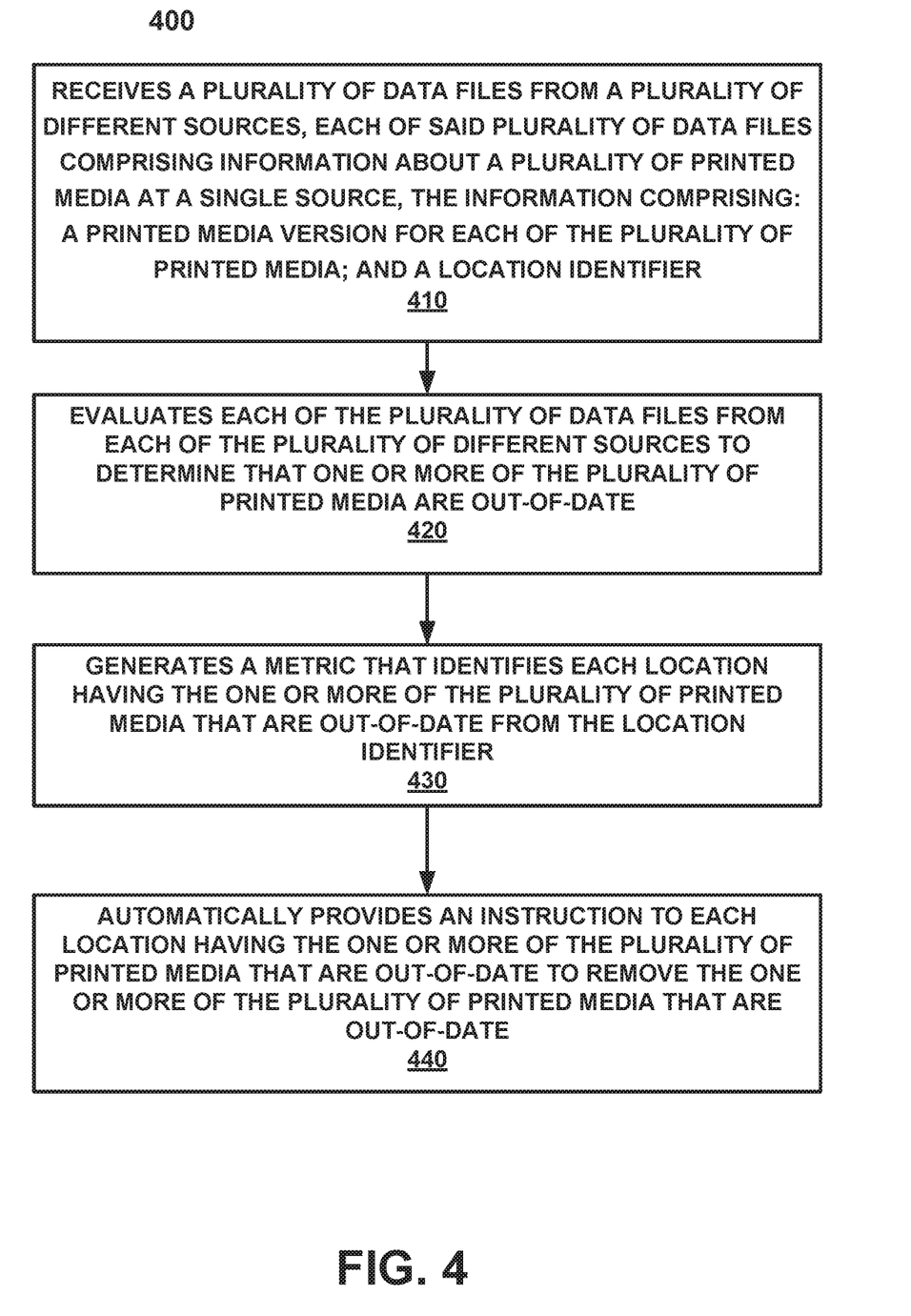
FIG. 4 is a flow diagram of a method for internet-based management of displayed printed media, in accordance with an embodiment.

With reference now to FIG. 4, a flow diagram 400 of a method for internet-based management of displayed printed media is shown in accordance with an embodiment.

Referring now to 410 of FIG. 4 and to FIGS. 2 and 3, one embodiment receives a plurality of data files from a plurality of different sources, each of the plurality of data files comprising information about a plurality of printed media 110 at a single source, the information including a printed media version for each of the plurality of printed media 110, and a location identifier.

In one embodiment, a device identifier is received for each device that transmitted the plurality of data files, the device identifier acting as the location identifier. In one embodiment, the device identifier is for reader 216. A database 227 including a plurality of locations and a list of device identifiers associated with each of the plurality of locations is accessed. In one embodiment, a determination is made about the location from which each of the plurality of data files was sent, the determination based on the received device identifier for each device (e.g., reader 216) that transmitted the plurality of data files and a search of the database 227.

With reference now to 420 of FIG. 4 and to FIGS. 2 and 3, one embodiment evaluates each of the plurality of data files from each of the plurality of different sources to determine that one or more of the plurality of printed media 110 are out-of-date.

Referring now to 430 of FIG. 4 and to FIGS. 2 and 3, one embodiment generates a metric that identifies each location having the one or more of the plurality of printed media 110 that are out-of-date using the location identifier.

In one embodiment, a description of the one or more of the plurality of printed media 110 that are out-of-date is provided in conjunction with the instruction provided to each location having the one or more of the plurality of printed media 110 that are out-of-date.

With reference now to 440 of FIG. 4 and to FIGS. 2 and 3, one embodiment automatically provides an instruction to each location having the one or more of the plurality of printed media 110 that are out-of-date to remove the one or more of the plurality of printed media 110 that are out-of-date.

In one embodiment, an alert is automatically provided to an underlying company, the alert indicating that the one or more of the plurality of printed media 110 that are out-of-date have been found in circulation. In one embodiment, in addition to providing the alert, a copy of the instruction that was automatically provided to each location having the one or more of the plurality of printed media 110 that are out-of-date, is also provided to the underlying company.

In one embodiment, each of the plurality of data files includes information about the plurality of printed media 110 at each different source, the information including: a total value identifying a total number of the plurality of printed media 110 that are in a display at each different source. Each of the plurality of data files from each of the plurality of different sources is evaluated to determine one or more locations having a display 335 that has less than a minimum number of printed media 110 therein. In one embodiment, a metric(s) 250 that identifies each location having display 335 that has less than a minimum number of printed media therein is generated, and an instruction is automatically provided to each location having display 335 that has less than a minimum number of printed media 110 therein to add additional printed media 110 thereto.

In one embodiment, each of the plurality of data files includes information about the plurality of printed media 110 at each different source, the information including: a removal value identifying a number of the plurality of printed media 110 that has been taken from display 335, and an addition value identifying a number of the plurality of printed media 110 that has been added to display 335. The removal value and the addition value are evaluated to determine a flow-rate of the plurality of printed media 110 at each different source. In one embodiment, a flow-rate metric that identifies the flow-rate of the plurality of printed media 110 at each different source is generated and automatically provided to the underlying company associated with the plurality of printed media 110.

Single Printed Media Tracking

In one embodiment, printed media management system 210 would receive a data transmission from a reader 216 having a reader identifier (e.g., A79B4). The data transmission would include the reader identifier (e.g., A79B4) and the number of printed media 110 (e.g., 25) that are within range of the reader 216. In one embodiment, printed media management system 210 would access database 227 which would include a plurality of reader identifiers and their associated locations. Printed media management system 227 would find reader identifier A79B4 in the database and obtain the associated location information therefrom (e.g., store 301). As such, printed media management system 210 would know that store 301 has 25 printed media 110 in their display.

Printed media management system 210 is also capable of managing a printed media 110 recall. For example, after printed media 110 is distributed, an error is determined in one or more aspects of the printed media 110. E.g., an incorrect term, the wrong discount amount, etc. The underlying company could contact printed media management system 210 and receive a metric(s) 250 that would include the total number of incorrect printed media 110 presently displayed, the location of each incorrect printed media 110 on display, etc. In one embodiment, the underlying company would be able to use this information to develop a removal from circulation plan. Moreover, printed media management system 210 would provide an alert if the incorrect printed media 110 ever turns up on a display 335.

Further, instead of the underlying company dealing with the incorrect printed media 110 in circulation, printed media management system 210 could identify and automatically initiate a removal from circulation of the incorrect printed media 110. Moreover, printed media management system 210 would maintain a continuous monitoring and automated removal of any later found incorrect printed media. For example, any locations with displays that contain the incorrect printed media 110 would receive an alert (e.g., a message, text, email, automated phone call, or the like) from printed media management system 210 that would identify and provide direction for the removal and disposal of the incorrect printed media. For example, the disposal direction could be to shred (or otherwise destroy) the incorrect printed media, or the disposal direction could be to return the incorrect printed media to a central location such that a count of the returned incorrect printed media could be compared with an amount of incorrect printed media initially sent-out. Such a comparison would be valuable in determining the number of incorrect printed media that are outstanding, if all of the incorrect printed media have been reacquired, etc.

Multiple Printed Media Tracking

In one embodiment, printed media management system 210 would receive a data transmission from a reader (e.g., A79B6). The data transmission would include the reader identifier (e.g., A79B6) and a total number of printed media 110 for each of a plurality of different printed media 110 types (e.g., 6-Romeo1 reward account applications, 35-Bravo6 credit account applications, and 17-Chalk6 coupons) that are within range of reader 216. In one embodiment, printed media management system 210 would look in a database 227 of reader identifiers and their associated locations, find reader A79B6 and obtain the associated location information therefrom (e.g., location B). As such, printed media management system 210 would know that location B has 6-Romeo1 reward account applications, 35-Bravo6 credit account applications, and 17-Chalk6 coupons in their display 335.

In general, the identification of the number of printed media 110 displayed at a location provides a number of different capabilities in addition to identifying any out-of-date applications. For example, if display 335 had 17 printed media 110 at the second to last received transmission, and display 335 has 19 printed media 110 in the present data transmission this information is useful for identifying the display 335 contains printed media 110, that display 335 is being re-filled with printed media 110, for identifying the number of printed media 110 that would need to be removed from display 335 when they pass a material date, and the like.

Printed Media Flow/Inventory Control

In one embodiment, in addition to the data transmission from reader 216 identifying the number of printed media 110 in display 335, the data transmission could include a printed media 110 flow-rate, e.g., the total number of printed media 110 that have been taken from display 335 since the previous transmission (or any other time period). For example, if reader 216 is collecting printed media 110 data and transmitting it every other day, reader 216 could track of the number of printed media 110 removed from display 335 and the number of printed media 110 added to display 335. In so doing, the computing system coupled to reader 216, or printed media management system 210, could use the removal and addition data to determine a flow-rate of printed media 110.

For instance, continuing with the example above and using a very straight-forward flow example, reader 216 would identify 17 printed media 110 in the display at the beginning of the new two-day data collection cycle. Moreover, during the two-day data collection period, reader 216 has tracked 32 printed media 110 taken from the display and 33 printed media 110 added to the display, with a resulting 19 printed media 110 in the display at the end of the two-day data collection period. If reader 216 was coupled with a computer system, the computer system could use the data to determine that the flow-rate of printed media 110 is 16 per day. This information would be transmitted to printed media management system 210 as part of printed media 110 data. In another embodiment, reader 216 transmits the raw printed media 110 data to printed media management system 210 who would make then perform the flow-rate determination.

To provide an even more accurate flow-rate, during the two-day data collection period, reader 216 could not only track printed media 110 that has been taken from the display, but also determine if any of the taken printed media 110 was returned to the display. For example, in one embodiment, reader 216 could identify the removal of a printed media 110 from display 335 and then identify an addition of a printed media 110 to display 335 within a given time period (e.g., within 5 minutes). In so doing, reader 216 would identify the addition of printed media 110 to display 335 to be a return of a previously taken printed media 110. For example, a customer could take a printed media 110 from display 335, review it, and then return it to the stack. Thus, in one embodiment, if reader 216 identifies the removal of a printed media 110 and the addition of a printed media 110 to be within 10 minutes, the data would indicate that no printed media 110 was taken during that activity.

In another embodiment, there could be a specific pattern to the filling of printed media 110 stack. For example, printed media 110 stack could be filled every night, or every morning and as such reader 216 would identify printed media 110 added to display 335 at other times to be returned printed media 110 instead of new printed media 110. For example, in the morning, reader 216 has tracked 10 printed media 110 added to the display (27 total if there were 17 initial), throughout the day reader 216 tracked 16 printed media 110 taken from the display and 4 printed media 110 added to the display, with a result of 15 printed media 110 in the display at the end of the day. Since printed media 110 rack is only filled in the morning, the flow-rate of printed media 110 would be 12 for the day (e.g., 16 out and 4 returned).

Again, if reader 216 was coupled with a computer system, the computer system could use the data to determine that the flow-rate of printed media 110 is 12 per day. This information would be transmitted to printed media management system 210 as part of printed media 110 data. In another embodiment, reader 216 transmits the raw printed media 110 data to printed media management system 210 who would make then perform the flow-rate determinations.

The flow-rate refinement could be based on the amount of printed media 110 added to display 335 over a given time period. For example, when printed media 110 stack is filled or topped up, it would likely include the addition of a number of printed media 110 in a short period. As such reader 216 would identify when a plurality of printed media 110 is added to display 335 and identify them as new printed media 110. Similarly, reader 216 would identify a single printed media 110 added to display 335 as being a returned printed media 110 instead of new printed media 110. For example, reader 216 has tracked 5 printed media 110 added to the display (22 total if there were 17 initial), throughout the day reader 216 tracked 16 printed media 110 taken from the display, 4 different times throughout the day that 1 printed media 110 added was added to the display, and a second time 7 printed media 110 was added to the display, resulting in 17 printed media 110 in the display at the end of the day. In this example, the flow-rate of printed media 110 would be 12 for the day (e.g., 12 added, 16 removed and 4 returned).

Thus, the flow-rate could be calculated for every data collection cycle and used to establish a location based average daily (weekly, monthly, etc.) printed media 110 flow-rate. In one embodiment, the printed media management system also provides an automated ordering capability for replacement and/or refilling of any printed media 110.

In one embodiment, the printed media management system can determine a flow-rate and compare it with an in-stock amount of printed media 110 for each location. Then, using the results of the comparison, the printed media management system would calculate that the location will run out of printed media 110 in a given number of days. Based on the calculated run-out date, the printed media management system could automatically place an order for a distribution of additional printed medial 110 to the location such that the additional printed media 110 arrives before the location runs out. For example, the printed media management system would know an order would take 5 days from when the order is placed until it is received at the location. Thus, using the calculated run-out day (RO-Day), the printed media management system would place an order for a re-stock no later than RO-Day minus 5 (e.g., 5 days before the expected run-out) thereby ensuring that no run-out occurs. It should be appreciated that the RO-day minus x could be adjusted for a margin of error (e.g., if it takes 5 days from placed until received then the order would be placed RO-Day minus 6, or 7, or 10, etc.)

In one embodiment, the printed media management system would also utilize an end-of-life knowledge to make sure that no automatic order occurs, or automatically adjust the size of the automatic order to meet the end-of-life requirements. For example, if a location has an RO-Day in 10 days, and there is no present end-of-life knowledge, then the refill order could be a monthly order, quarterly order, etc. In contrast, if a location has a RO-Day in 10 days, and the expected end-of-life for the pamphlet is in a month (e.g., 30 days), then the automatic refill order would be an amount that will carry the location with the proper number of pamphlets for the additional 20 days. In yet another embodiment, if a location has a RO-Day in 10 days, and the expected end-of-life for the pamphlet is in a week (e.g., 7 days), then an automatic refill order would not be placed.

Although a data collection cycle of 2-days and 1 day was used in the examples above it was done for clarity. It should be appreciated that the data collection cycle could be on a fixed schedule, e.g., daily, hourly, weekly, etc. or it could be a variable schedule that depends upon the level of accuracy, tracking, and/or any other metric that is to be obtained.

Out-of-Date Printed Media Removal and Replacement

When aspects of a printed media 110 are changed, the now out-of-date printed media 110 will need to be removed from circulation and replaced with new printed media 110. In one embodiment, printed media 110 data maintained by printed media management system 210 can be cross-referenced with the now out-of-date printed media 110 and a message to remove the now out-of-date printed media 110 from circulation (e.g., remove them from display 335, take down a poster, etc.) can be sent to a store associate (manager, etc.).

In addition, printed media 110 data maintained by printed media management system 210 can be used to determine how many new printed media 110 need to be printed and how many new printed media 110 should be sent to each location. For example, using printed media 110 flow-rate information, printed media management system 210 can determine the total number of printed media 110 that were moved across all of the locations. Moreover, depending upon the granularity of the determined printed media 110 flow-rate, printed media management system 210 the total number of printed media 110 that were moved across all of the locations for a given time period. For example, the total number per month, per quarter, etc.

In addition, the expected life span of printed media 110 could be used in the determination the number of new printed media 110 that should be printed. For example, if the expected life span of printed media 110 is 3-months, and the total number of printed media 110 that were moved across all of the locations was 200,000, then the new printed media 110 order could be the same number, the same number plus a percentage, etc.

Further, since printed media 110 flow-rate is known, the new printed media 110 order could encompass the entire expected life span of printed media 110 (e.g., 200,000*3=600,000), a month of printed media 110 (e.g., 200,000) or any other combination that could be based on one or more cost metrics such as bulk print discounts, storage costs, etc.

In one embodiment, the printed media management system also provides an automated ordering capability for replacement and/or refilling of any printed media 110. In one embodiment, the number of new printed media 110 ordered would somewhat mirror the number of previous printed media 110 moved but the management could also analyze each individual location to determine if the locations underperformed. For example, if 80% of the locations moved an average of 100 printed media 110 a month, and 10% of the locations moved an average of 40 printed media 110 and month, it could be determined that those locations with the lower average should have moved more. If it is determined that those locations should have been able to move a larger number of printed media 110 (e.g., 60 per month), then an additional number of printed media 110 could be added to the total order. Moreover, the system could identify the locations and suggest some additional training/guidance on how to move printed media 110 should be provided to those identified low performing locations.

In one embodiment, the number of new printed media 110 that are sent to each location is be determined using printed media 110 flow-rate information from printed media management system 210. In other words, instead of sending a standard number of printed media 110 to each location, the flow-rate for each location, for each of a plurality of distribution centers that include a number of different locations, etc. For example, based on the flow-rate information, it was determined that location A moved 200 printed media 110, while location B moved 10 for a given time period (e.g., per month). In one embodiment, the distribution would mirror the number of printed media 110 moved, e.g., location A would receive 600 printed media 110 (e.g., 200*3-printed media 110 expected life span) and location B would receive 30 printed media 110 (e.g., 10*3).

In another embodiment, the distribution would somewhat mirror the number of printed media 110 moved but the management could also focus some analysis to determine if location B could have moved more. If it is determined that location B should have been able to move a larger number of printed media 110 (e.g., 30 per month), then an additional number of printed media 110 and possibly some additional training/guidance on how to move printed media 110 would be provided to location B. As such, location A would receive 600 printed media 110 (e.g., 200*3) and location B would receive 90 printed media 110 (e.g., 30*3). As discussed above, the shipment of printed media 110 could be based on a monthly basis (or any other time-period) based on shipping costs, bulk print discounts, storage costs, etc.

In one embodiment, the number of new printed media 110 that are sent to each distribution center (that comprise a defined number of locations) is determined using printed media 110 flow-rate information from printed media management system 210. In other words, instead of sending a standard number of printed media 110 to each distribution center, the actual performance of the distribution center would be used as a guide. For example, based on the flow-rate information, it was determined that distribution center Y moved 20,000 printed media 110, while distribution center Z moved 30,000 printed media 110 for a given time period (e.g., per month). In one embodiment, the distribution would mirror the number of printed media 110 moved, e.g., distribution center Y would receive 60,000 printed media 110 (e.g., 20,000*3-printed media 110 expected life span) and distribution center Z would receive 90,000 printed media 110 (e.g., 30,000*3).

As discussed above, the shipment of printed media 110 could be based on a monthly basis (or any other time-period) based on shipping costs, bulk print discounts, storage costs, etc. Further, as discussed above, if one or more locations were determined to be underperforming, then an additional number of printed media 110 would be provided to the distribution center for dispersal to the underperforming locations and some additional training/guidance on how to move printed media 110 could also be provided to the underperforming locations.

Out-of-Date Printed Media Audit

If any of the out-of-date printed media 110 (documents, applications, posters, or the like) are not removed from circulation, reader 216 will continue to detect the out-of-date printed media 110 and provide that information to printed media management system 210 during its regularly scheduled data transmission. In one embodiment, when out-of-date printed media 110 are included in printed media 110 data from reader 216, printed media management system 210 could generate an alert. In one embodiment, the alert could be sent to a manager (associate or the like) at the location where the out-of-date printed media 110 are still being displayed. In one embodiment, the alert could be sent to a corporate office, a compliance auditor, or the like. In general, the alert could be a message that includes the issue being raised (e.g., location A has out-of-date printed media 110 on display), an indicator that the recipient should access printed media management system 210 to see details about the issue, or any other type of alert that could be informative, partially informative, or merely a call to action.

When the alert is received, the party receiving the alert would either read the information provided in the alert, access printed media management system 210 to obtain the information or the like. In one embodiment, the alert could be a report (or an indicator to access the report) of a store that has out-of-date printed media 110 on display.

In one embodiment, printed media management system 210 could provide a running compliance percentage of those locations that have removed out-of-date printed media 110 versus those that have not removed out-of-date printed media 110. For example, when printed media 110 on display pass the material date, a remove from circulation directive could be sent to every location having the now out-of-date printed media 110. When the next transmission of reader 216 provided data is received at printed media management system 210, printed media management system 210 could provide a compliance percentage of locations that have removed out-of-date printed media 110 versus those that have not removed out-of-date printed media 110.

For example, on the material date (M-day) 100% of locations have out-of-date printed media 110 displayed. In the next received reports, e.g., M+1, 50% of locations have out-of-date printed media 110 displayed. At M+2, 25% of locations have out-of-date printed media 110 displayed. At M+3, 20% of locations have out-of-date printed media 110 displayed. At M+4, 10% of locations have out-of-date printed media 110 displayed. At M+5, 6% of locations have out-of-date printed media 110 displayed. At M+6, 3% of locations have out-of-date printed media 110 displayed. At M+7, 1% of locations have out-of-date printed media 110 displayed, etc.

In addition to providing a percentage of locations with out-of-date printed media 110, printed media management system 210 can provide the location(s) where the out-of-date printed media 110 remain in circulation. In one embodiment, printed media management system 210 can automatically generate an assignment that sends a field representative to the location(s) to remove the out-of-date printed media 110 from circulation, provide training to mitigate future non-compliance issues, and the like.

In one embodiment, printed media management system 210 will not automatically generate an assignment, but will instead provide the information to a manager, director, or the like, and they would send the field representative to the location(s) to remove the out-of-date printed media 110 from circulation, provide training to mitigate future non-compliance issues, and the like.

Example Computer System

With reference now to FIG. 5, portions of the technology for providing a communication composed of computer-readable and computer-executable instructions that reside, for example, in non-transitory computer-readable medium (or storage media, etc.) of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components described herein may be combined with some or all of the components of FIG. 5 to practice the present technology.

FIG. 5 illustrates an example computer system 500 used in accordance with embodiments of the present technology. It is appreciated that computer system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a disk, a compact disc, a flash drive, and the like coupled thereto.

Computer system 500 of FIG. 5 includes an address/data/control bus 504 for communicating information, and a processor 506A coupled to bus 504 for processing information and instructions. As depicted in FIG. 5, computer system 500 is also well suited to a multi-processor environment in which a plurality of processors 506A, 506B, and 506C are present. Conversely, computer system 500 is also well suited to having a single processor such as, for example, processor 506A. Processors 506A, 506B, and 506C may be any of various types of microprocessors. Computer system 500 also includes data storage features such as a computer usable volatile memory 508, e.g., random access memory (RAM), coupled to bus 504 for storing information and instructions for processors 506A, 506B, and 506C.

Computer system 500 also includes computer usable non-volatile memory 510, e.g., read only memory (ROM), coupled to bus 504 for storing static information and instructions for processors 506A, 506B, and 506C. Also present in computer system 500 is a data storage unit 512 (e.g., a magnetic disk drive, optical disk drive, solid state drive (SSD), and the like) coupled to bus 504 for storing information and instructions. Computer system 500 also can optionally include an alpha-numeric input device 514 including alphanumeric and function keys coupled to bus 504 for communicating information and command selections to processor 506A or processors 506A, 506B, and 506C. Computer system 500 also can optionally include a cursor control device 516 coupled to bus 504 for communicating user input information and command selections to processor 506A or processors 506A, 506B, and 506C. Cursor control device may be a touch sensor, gesture recognition device, and the like. Computer system 500 of the present embodiment can optionally include a display device 518 coupled to bus 504 for displaying information.

Referring still to FIG. 5, display device 518 of FIG. 5 may be a liquid crystal device, cathode ray tube, OLED, plasma display device or other display device suitable for creating graphic images and alpha-numeric characters recognizable to a user. Cursor control device 516 allows the computer user to dynamically signal the movement of a visible symbol (cursor) on a display screen of display device 518. Many implementations of cursor control device 516 are known in the art including a trackball, mouse, touch pad, joystick, non-contact input, gesture recognition, voice commands, bio recognition, and the like. In addition, special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

Computer system 500 is also well suited to having a cursor directed by other means such as, for example, voice commands. Computer system 500 also includes an I/O device 520 for coupling computer system 500 with external entities. For example, in one embodiment, I/O device 520 is a modem for enabling wired or wireless communications between computer system 500 and an external network such as, but not limited to, the Internet or intranet. A more detailed discussion of the present technology is found below.

Referring still to FIG. 5, various other components are depicted for computer system 500. Specifically, when present, an operating system 522, applications 524, modules 526, and data 528 are shown as typically residing in one or some combination of computer usable volatile memory 508, e.g. random-access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described computer system 500.

Computer system 500 also includes one or more signal generating and receiving device(s) 530 coupled with bus 504 for enabling computer system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one (or more) communication interface 532 for coupling information to and/or from computer system 500. Communication interface 532 may include a serial port, parallel port, Universal Serial Bus (USB), Ethernet port, Bluetooth, thunderbolt, near field communications port, WiFi, Cellular modem, or other input/output interface. Communication interface 532 may physically, electrically, optically, or wirelessly (e.g., via radio frequency) couple computer system 500 with another device, such as a mobile phone, radio, or computer system.

Computer system 500 is only one example of a suitable computing environment and is not intended to suggest any limitation as to the scope of use or functionality of the present technology. Neither should the computing environment be interpreted as having any dependency or requirement relating to any one or combination of components illustrated in the example computer system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method comprising:
   repeatedly obtaining, at a short-range radio receiver, a plurality of data files from a plurality of smart identifiers, said plurality of data files comprising real-time information about a plurality of printed media being displayed at a public display, said real-time information comprising:
      a printed media version for each of said plurality of printed media; and
      a location identifier,
   providing from said short-range receiver, automatically and repeatedly on a predefined transmission interval, said plurality of data files to a computing system;
   repeatedly obtaining, at an imaging device, said plurality of data files;
   providing from said imaging device, automatically and repeatedly on a predefined transmission interval, said plurality of data files to said computing system;
   evaluating, at said computing system, each of said plurality of data files from each of said plurality of different sources to determine at least one printed media version of said plurality of printed media displayed at said public display is an out-of-date printed media version;
   generating, at said computing system, a metric that identifies a location of said public display having said out-of-date printed media version from said location identifier; and
   automatically providing, from said computing system, an instruction to said location having said out-of-date printed media version to remove said out-of-date printed media version from said public display.

2. The method of claim 1, further comprises:
   providing a description of said out-of-date printed media version in conjunction with said instruction provided to said location having said out-of-date printed media version.

3. The method of claim 1, further comprising:
   receiving a unique identifier for each source of said plurality of different sources that transmitted said plurality of data files;
   accessing a database comprising:
      a plurality of locations; and
      a list of unique identifiers for each of said plurality of different sources, each of said unique identifiers associated with one of said plurality of locations; and
   determining, based on said received unique identifier for each source of said plurality of different sources that transmitted said plurality of data files, said location from which each of said plurality of data files was sent.

4. The method of claim 1, further comprising:
   automatically providing an alert to an underlying company,
      said alert indicating said out-of-date printed media version has been found in circulation.

5. The method of claim 4, further comprising:
   providing, to said underlying company, a copy of said instruction that was automatically provided to each location having said out-of-date printed media version.

6. The method of claim 1, further comprising:
   receiving said plurality of data files from said plurality of different sources, each of said plurality of data files comprising real-time information about said plurality of printed media at said public display, said real-time information further comprising:
  a total value identifying a total number of said plurality of printed media that are at said public display;
  evaluating each of said plurality of data files from each of said plurality of different sources to determine said public display having less than a minimum number of printed media therein;
  generating a metric that identifies said location having said public display having less than a minimum number of printed media therein; and
  automatically providing an instruction to said location having said public display having less than a minimum number of printed media therein to add additional printed media thereto.

7. The method of claim 1, further comprising:
  receiving said plurality of data files from said plurality of different sources, each of said plurality of data files comprising real-time information about said plurality of printed media at said public display, said real-time information further comprising:
    a removal value identifying a number of said plurality of printed media taken from said public display; and
    an addition value identifying a number of said plurality of printed media added to said public display;
  evaluating said removal value and said addition value to determine a flow-rate of said plurality of printed media at said public display;
  generating a flow-rate metric that identifies said flow-rate of said plurality of printed media at said public display; and
  automatically providing said flow-rate metric to an underlying company associated with said plurality of printed media.

8. A non-transitory computer-readable storage medium having instructions embodied therein that when executed cause a mobile computing device to perform a method comprising:
  receiving, automatically and repeatedly at a predefined transmission interval and via a network connection, a plurality of data files from a plurality of different sources, wherein at least one of said plurality of different sources is a short-range radio receiver and at least another of said plurality of different sources is an imaging device, each of said plurality of data files comprising real-time information about a plurality of printed media being displayed at one or more public displays, said real-time information comprising:
    a printed media version for each of said plurality of printed media; and
    a unique identifier for each of said plurality of different sources that transmitted a data file of said plurality of data files;
  accessing a database comprising:
    a plurality of locations, and
    a list of unique identifiers for each of said plurality of different sources, each of said unique identifiers associated with one of said plurality of locations;
  utilizing said unique identifier for each source that transmitted said data file of said plurality of data files in conjunction with a search of said database to determine a location from which each of said plurality of data files was sent;
  evaluating each of said plurality of data files from each of said plurality of different sources to determine at least one printed media version of said plurality of printed media displayed at one or more of said public displays is an out-of-date printed media version;
  generating a metric that identifies each location of said one or more public displays having said out-of-date printed media version; and
  automatically providing an instruction to each location having said out-of-date printed media version to remove said out-of-date printed media version from said one or more public displays.

9. The non-transitory computer-readable storage medium of claim 8, further comprising:
  providing a description of said out-of-date printed media version in conjunction with said instruction provided to each location having said out-of-date printed media version.

10. The non-transitory computer-readable storage medium of claim 8, further comprising:
  automatically providing an alert to an underlying company, said alert indicating said out-of-date printed media version has been found in circulation.

11. The non-transitory computer-readable storage medium of claim 10, further comprising:
  providing, to said underlying company, a copy of said instruction that was automatically provided to each location having said out-of-date printed media version.

12. The non-transitory computer-readable storage medium of claim 8, further comprising:
  receiving said plurality of data files from said plurality of different sources, each of said plurality of data files comprising real-time information about said plurality of printed media at said one or more public displays, said real-time information further comprising:
    a total value identifying a total number of said plurality of printed media that are in said one or more public displays;
  evaluating each of said plurality of data files from each of said plurality of different sources to determine one or more locations having one or more public displays having less than a minimum number of printed media therein;
  generating a metric that identifies each location having said one or more public displays having less than a minimum number of printed media therein; and
  automatically providing an instruction to each location having said one or more public displays having less than a minimum number of printed media therein to add additional printed media thereto.

13. The non-transitory computer-readable storage medium of claim 8, further comprising:
  receiving said plurality of data files from said plurality of different sources, each of said plurality of data files comprising real-time information about said plurality of printed media at said one or more public displays, said real-time information further comprising:
    a removal value identifying a number of said plurality of printed media taken from said one or more public displays; and
    an addition value identifying a number of said plurality of printed media added to said one or more public displays;
  evaluating said removal value and said addition value to determine a flow-rate of said plurality of printed media at each different source;
  generating a flow-rate metric that identifies said flow-rate of said plurality of printed media at said one or more public displays; and automatically providing said flow-rate metric to an underlying company associated with said plurality of printed media.

14. A system comprising:
a memory storing instructions;
a network connection to receive a plurality of data files from a plurality of different devices automatically and repeatedly on a predefined transmission interval, wherein at least one of said plurality of different devices is a short-range radio receiver and at least another of said plurality of different devices is an imaging device, each of said plurality of data files comprising real-time information about a plurality of printed media being displayed at one or more public displays, said real-time information comprising:
  a printed media version for each of said plurality of printed media; and
  a location identifier for each of said one or more public displays; and
one or more processors, executing said instructions, to:
evaluate each of said plurality of data files from each of said plurality of different devices to determine at least one printed media version of said plurality of printed media displayed at one or more of said public displays is an out-of-date printed media version;
generate a metric that identifies each location of said one or more public displays having said out-of-date printed media version from said location identifier; and
automatically provide an instruction to each location having said out-of-date printed media version to remove said out-of-date printed media version from said one or more public displays.

15. The system of claim 14, wherein said one or more processors are further to:
provide a description of said out-of-date printed media version in conjunction with said instruction provided to each location having said out-of-date printed media version.

16. The system of claim 14, wherein said network connection is further to:
receive a unique identifier for each device of said plurality of different devices that transmitted said plurality of data files; and
said one or more processors are further to:
  access a database comprising:
    a plurality of locations; and
    a list of unique identifiers for each of said plurality of different devices, wherein each said unique identifier is associated with a location from said plurality of locations; and
  determine, based on said unique identifier for each device of said plurality of different devices that transmitted said plurality of data files, said location from which each of said plurality of data files was sent.

17. The system of claim 14, wherein the one or more processors are further to:
automatically provide an alert to an underlying company, said alert indicating said out-of-date printed media version has been found in circulation.

18. The system of claim 17, wherein said one or more processors are further to:
provide, to said underlying company, a copy of said instruction that was automatically provided to each location having said out-of-date printed media version.

19. The system of claim 14, wherein said network connection is further to:
receive said plurality of data files from said plurality of different devices, each of said plurality of data files comprising real-time information about said plurality of printed media at said one or more public displays, said real-time information further comprising:
  a total value identifying a total number of said plurality of printed media that are at said one or more public displays; and
said one or more processors are further to:
  access a database comprising:
    a plurality of locations; and
    a list of unique identifiers for each of said plurality of different devices, wherein each of said unique identifiers is associated with a location from said plurality of locations; and
  evaluate each of said plurality of data files from each of said plurality of different devices to determine one or more locations of said plurality of locations having said one or more public displays with less than a minimum number of printed media therein;
  generate a metric that identifies each location having said one or more public displays with less than a minimum number of printed media therein; and
  automatically provide an instruction to each location having said one or more public displays with less than a minimum number of printed media therein to add additional printed media thereto.

20. The system of claim 14, wherein said network connection is further to:
receive said plurality of data files from said plurality of different devices, each of said plurality of data files comprising real-time information about said plurality of printed media at said one or more public displays, said real-time information further comprising:
  a removal value identifying a number of said plurality of printed media taken from said one or more public displays; and
  an addition value identifying a number of said plurality of printed media added to said one or more public displays; and
said one or more processors are further to:
  evaluate said removal value and said addition value to determine a flow-rate of said plurality of printed media at said one or more public displays;
  generate a flow-rate metric that identifies said flow-rate of said plurality of printed media at said one or more public displays; and
  automatically provide said flow-rate metric to an underlying company associated with said plurality of printed media.

* * * * *